(12) United States Patent
Watanabe

(10) Patent No.: US 10,696,767 B2
(45) Date of Patent: Jun. 30, 2020

(54) VINYL CHLORIDE-VINYL ACETATE COPOLYMER PARTICLES AND AUTOMOBILE UNDERBODY COATING AGENT

(71) Applicant: TOSOH CORPORATION, Shunan-shi, Yamaguchi (JP)

(72) Inventor: Kazunori Watanabe, Yamaguchi (JP)

(73) Assignee: TOSOH CORPORATION, Shunan (JP)

( * ) Notice: Subject to any disclaimer, the term of this patent is extended or adjusted under 35 U.S.C. 154(b) by 64 days.

(21) Appl. No.: 16/076,413

(22) PCT Filed: Feb. 7, 2017

(86) PCT No.: PCT/JP2017/004378
§ 371 (c)(1),
(2) Date: Aug. 8, 2018

(87) PCT Pub. No.: WO2017/138518
PCT Pub. Date: Aug. 17, 2017

(65) Prior Publication Data
US 2019/0040170 A1    Feb. 7, 2019

(30) Foreign Application Priority Data

Feb. 9, 2016 (JP) .................................. 2016-022420
Nov. 1, 2016 (JP) .................................. 2016-214083

(51) Int. Cl.
| | | |
|---|---|---|
| C08L 27/06 | (2006.01) | |
| C08F 214/06 | (2006.01) | |
| C09D 127/06 | (2006.01) | |
| C08K 5/41 | (2006.01) | |
| C08F 2/26 | (2006.01) | |
| C08F 218/08 | (2006.01) | |
| C09D 131/04 | (2006.01) | |

(52) U.S. Cl.
CPC .............. *C08F 214/06* (2013.01); *C08F 2/26* (2013.01); *C08F 218/08* (2013.01); *C08K 5/41* (2013.01); *C09D 127/06* (2013.01); *C09D 131/04* (2013.01); *C08F 2500/24* (2013.01); *C08F 2800/20* (2013.01)

(58) Field of Classification Search
CPC ........ C08F 214/06; C08F 2/26; C08F 218/08; C08F 2500/24; C08F 2800/20; C08K 5/41; C08K 5/42; C09D 127/06; C09D 131/04
See application file for complete search history.

(56) References Cited

U.S. PATENT DOCUMENTS

| | | | |
|---|---|---|---|
| 3,875,130 | A | 4/1975 | Kemp |
| 4,046,730 | A | 9/1977 | Tortai |
| 2013/0202819 | A1* | 8/2013 | Ito et al. ................... B41M 5/52 428/32.5 |

FOREIGN PATENT DOCUMENTS

| | | |
|---|---|---|
| CN | 102417556 | 4/2012 |
| CN | 102807644 | 12/2012 |
| JP | 49-111990 | 10/1974 |
| JP | 49-049039 | 12/1974 |
| JP | 51-057792 | 5/1976 |
| JP | 02-208307 | 8/1990 |
| JP | 06-056915 | 3/1994 |
| JP | 2009-221335 | 10/2009 |
| JP | 2010-241977 | 10/2010 |

OTHER PUBLICATIONS

International Search Report for PCT/JP2017/004378, dated Apr. 18, 2017, 5 pages.
Written Opinion of the ISA for PCT/JP2017/004378, dated Apr. 18, 2017, 4 pages.
International Preliminary Report dated Aug. 14, 2018 issued in PCT/JP2017/004378 with English translation (5 pages).

* cited by examiner

*Primary Examiner* — Nathan M Nutter
(74) *Attorney, Agent, or Firm* — Nixon & Vanderhye P.C.

(57) ABSTRACT

To provide vinyl chloride-vinyl acetate copolymer particles, which have a small change with time in sol viscosity when kneaded together with a plasticizer and are excellent in the mechanical strength during low temperature processing, and applications represented by a coating agent, particularly an automobile underbody coating or an automotive sealant.
Vinyl chloride-vinyl acetate copolymer particles comprising a vinyl chloride-vinyl acetate copolymers in which a vinyl acetate residue unit content is continuously distributed in a range of 0 to 30% by weight and the distribution has one local maximum, and which has an average polymerization degree of 1,500 to 3,000 and an average vinyl acetate residue unit content of 5 to 15% by weight, and wherein an average diameter of a primary particle of the vinyl chloride-vinyl acetate copolymers is from 1 to 2 μm.

7 Claims, No Drawings

VINYL CHLORIDE-VINYL ACETATE COPOLYMER PARTICLES AND AUTOMOBILE UNDERBODY COATING AGENT

This application is the U.S. national phase of International Application No. PCT/JP2017/004378 filed Feb. 7, 2017 which designated the U.S. and claims priority to JP Patent Application No. 2016-022420 filed Feb. 9, 2016 and JP Patent Application No. 2016-214083 filed Nov. 1, 2016, the entire contents of each of which are hereby incorporated by reference.

TECHNICAL FIELD

The present invention relates to vinyl chloride-vinyl acetate copolymer composition particles and the use thereof, and more particularly, it relates to vinyl chloride-vinyl acetate copolymer composition particles useful for a coating agent, particularly for an automobile underbody coating or an automotive sealant and the use thereof.

BACKGROUND ART

A vinyl chloride resin for paste processing (hereinafter, abbreviated as paste PVC sometimes) is ordinarily kneaded together with a plasticizer, a filler, a stabilizer or other compounding agents to prepare a paste PVC sol, and the paste PVC sol is used in a variety of molded products, for example, wallpaper, tile carpet and gloves by various molding method. Further, in the application of low processing temperature as paste PVC having a property excellent in gelation meltability for obtaining mechanical strength even at a relatively low temperature, a vinyl chloride/vinyl acetate copolymer resin obtained by copolymerizing vinyl acetate with vinyl chloride is known. Moreover, as a countermeasure for storage stability for a long period of time from the preparation of paste PVC sol to the processing, paste PVC having a small change with time in sol viscosity has been required.

As a method for producing paste PVC having a small change with time in sol viscosity, a method for producing a polyvinyl chloride resin for paste processing by a seed microsuspension polymerization using a specific surfactant has been proposed (see, for example, Patent Document 1).

In addition, a polyvinyl chloride resin composition in which a specific compound is incorporated into a paste PVC sol has been proposed (see, for example, Patent Document 2).

PRIOR ART DOCUMENT

Patent Document

Patent Document 1: JP-A-H6-056915
Patent Document 2: JP-A-2010-241977

DISCLOSURE OF THE INVENTION

Problems to Be Solved by the Invention

However, the paste PVC obtained by the method proposed in Patent Document 1 was not able to satisfy the market demand, when it was used in applications requiring strict stability against the change with time in sol viscosity, for example, in applications for an automobile underbody coating or an automotive sealant.

On the other hand, the method proposed in Patent Document 2 is able to provide a paste PVC sol having a relatively small change with time in viscosity, but it does not aim to provide a vinyl chloride resin for paste processing and there is no investigation as to viscosity stability for a long period of time.

Therefore, the invention provides vinyl chloride-vinyl acetate copolymer composition particles, which have an extremely small change with time in sol viscosity, are excellent in mechanical strength during low temperature processing, and have excellent properties for a coating agent, particularly for an automobile underbody coating or an automotive sealant, and an automobile underbody coating agent.

Means for Solving the Problems

As a result of the intensive investigations to solve the problems described above, the inventor has found that vinyl chloride-vinyl acetate copolymer particles having a specific distribution of a vinyl acetate residue unit content, a specific polymerization degree, a specific amount of an average vinyl acetate residue unit content, and a specific average diameter of a primary particle can be provide a paste PVC sol, which is excellent in mechanical strength and has an extremely small change with time in sol viscosity to complete the invention.

That is, the present invention resides in [1] to [7] described below.

[1] Vinyl chloride-vinyl acetate copolymer particles comprising:
  vinyl chloride-vinyl acetate copolymers in which a vinyl acetate residue unit content is continuously distributed in a range of 0 to 30% by weight and the distribution has one local maximum, and which have an average degree of polymerization of 1,500 to 3,000 and an average vinyl acetate residue unit content of 5 to 15% by weight,
  wherein an average diameter of a primary particle of the vinyl chloride-vinyl acetate copolymers is from 1 to 2 µm.

[2] The vinyl chloride-vinyl acetate copolymer particles as described in [1] comprising:
  a composition containing from 0.5 to 2 parts by weight of an alkyl sulfate ester salt with respect to 100 parts by weight of vinyl chloride-vinyl acetate copolymers in which a vinyl acetate residue unit content is continuously distributed in a range of 0 to 30% by weight and the distribution has one local maximum, and which have an average degree of polymerization of 1,500 to 3,000 and an average vinyl acetate residue unit content of 5 to 15% by weight, wherein an average diameter of a primary particle of the vinyl chloride-vinyl acetate copolymers is from 1 to 2 µm.

[3] The vinyl chloride-vinyl acetate copolymer particles as described in [2],
  wherein the alkyl sulfate ester salt is one selected from the group consisting of lithium lauryl sulfate, sodium lauryl sulfate, ammonium lauryl sulfate and triethanol ammonium lauryl sulfate.

[4] The vinyl chloride-vinyl acetate copolymer particles as described in any one of [1] to [3],
  wherein the vinyl acetate residue unit content is continuously distributed in a range of 0 to 25% by weight and the distribution has one local maximum in the vinyl chloride-vinyl acetate copolymers.

[5] The vinyl chloride-vinyl acetate copolymer particles as described in any one of [1] to [4],
wherein the vinyl acetate residue unit content is continuously distributed in a range of 0 to 20% by weight and the distribution has one local maximum in the vinyl chloride-vinyl acetate copolymers.

[6] An automobile underbody coating agent containing the vinyl chloride-vinyl acetate copolymer particles as described in any one of [1] to [5].

[7] A method for producing an automobile underbody coating comprising heat sealing the automobile underbody coating agent as described in [6].

The invention will be described in detail below.

The vinyl chloride-vinyl acetate copolymer particles of the invention are an aggregate of primary particles of a vinyl chloride-vinyl acetate copolymer and have a particle shape of the aggregated primary particles. The vinyl chloride-vinyl acetate copolymer particles comprise vinyl chloride-vinyl acetate copolymers, which has a vinyl acetate residue unit content continuously distributed in a range of 0 to 30% by weight, one local maximum of the distribution, an average polymerization degree of 1,500 to 3,000, and an average vinyl acetate residue unit content of 5 to 15% by weight, and the vinyl chloride-vinyl acetate copolymer particles have an average diameter of a primary particle of 1 to 2 µm, and preferably comprise a composition containing from 0.5 to 2 parts by weight of an alkyl sulfate ester salt with respect to 100 parts by weight of a vinyl chloride-vinyl acetate copolymers, which have a vinyl acetate residue unit content continuously distributed in a range of 0 to 30% by weight, one local maximum of the distribution, an average polymerization degree of 1,500 to 3,000, and an average vinyl acetate residue unit content of 5 to 15% by weight, and the vinyl chloride-vinyl acetate copolymer particles have an average diameter of a primary particle of 1 to 2 µm.

The vinyl chloride-vinyl acetate copolymers constituting the vinyl chloride-vinyl acetate copolymer particles of the invention have an average vinyl acetate residue unit content of 5 to 15% by weight (that is, the average vinyl acetate residue unit content is equivalent to 5 to 15 parts by weight with respect to 100 parts by weight of the vinyl chloride-vinyl acetate copolymers) and an average polymerization degree of 1,500 to 3,000. The vinyl chloride-vinyl acetate copolymers have a vinyl acetate residue unit content continuously distributed in a range of 0 to 30% by weight, one local maximum of the distribution, and an average vinyl acetate residue unit content of 5 to 15% by weight.

Because of being extremely excellent in both the mechanical strength particularly during low temperature processing and the change with time in viscosity when used as a paste PVC sol, excellent particularly in use for an automobile underbody coating or an automotive sealant, and excellent in strength properties, the average vinyl acetate residue unit content is preferably from 5 to 10% by weight (that is, the average vinyl acetate residue unit content is equivalent to 5 to 10 parts by weight with respect to 100 parts by weight of the vinyl chloride-vinyl acetate copolymers), particularly from 6 to 9% by weight (that is, the average vinyl acetate residue unit content is equivalent to 6 to 9 parts by weight with respect to 100 parts by weight of the vinyl chloride-vinyl acetate copolymers). More preferably, the average vinyl acetate residue unit content is from 6 to 8% by weight (that is, the average vinyl acetate residue unit content is equivalent to 6 to 8 parts by weight with respect to 100 parts by weight of the vinyl chloride-vinyl acetate copolymers). Here, in the case where the average vinyl acetate residue unit content is less than 5% by weight, it is not favorable because a molded article obtained by subjecting the vinyl chloride-vinyl acetate copolymer composition to low temperature processing has low mechanical strength. On the other hand, in the case where the average vinyl acetate residue unit content exceeds 15% by weight, it is not favorable because the change with time in viscosity becomes large when used as a sol.

Further, the average polymerization degree of the vinyl chloride-vinyl acetate copolymers can be determined, for example, by a method in accordance with JIS K6721. The average polymerization degree of the vinyl chloride-vinyl acetate copolymers is from 1,500 to 3,000. Because of being excellent in use for an automobile underbody coating or an automotive sealant, the average polymerization degree is preferably from 1,800 to 2,800, and more preferably from 1,900 to 2,500. Here, in the case where the average polymerization degree is less than 1,500, it is not favorable because the mechanical strength during low temperature processing becomes inferior. Further, the change with time in viscosity becomes large when used as a paste PVC sol. On the other hand, in the case where the average polymerization degree exceeds 3,000, although the change with time in viscosity is excellent when used as a paste PVC sol, it is not favorable in view of production because the polymerization time is prolonged.

The vinyl chloride-vinyl acetate copolymers have a vinyl acetate residue unit content continuously distributed in a range of 0 to 30% by weight, and one local maximum of the distribution. Among them, it is preferred that the vinyl acetate residue unit content is continuously distributed in a range of 0 to 25% by weight and one local maximum of the distribution is present. Further, because of smaller change with time in viscosity when used as a paste PVC sol and excellent, it is particularly preferred that the vinyl acetate residue unit content is continuously distributed in a range of 0 to 20% by weight and one local maximum of the distribution is present. More preferably, the vinyl acetate residue unit content is continuously distributed in a range of 0 to 18% by weight and one local maximum of the distribution is present. As distribution measurement for the vinyl acetate residue unit content, for example, the distribution measurement by measuring the vinyl acetate residue unit by an evaporative light scattering detector using a gradient elution method of liquid chromatography can be exemplified. In the case where the vinyl acetate residue unit content is not continuously distributed in a range of 0 to 30% by weight, for example, in the case where it is dispersed beyond 30% by weight, the vinyl chloride-vinyl acetate copolymer particles obtained are inferior in workability. Further, in the case where the number of the local maximum of the distribution of the vinyl acetate residue unit content is not one, for example, in the case where the vinyl acetate residue unit content is continuously distributed in a range of 0 to 30% by weight and the distribution has two local maximum, the vinyl chloride-vinyl acetate copolymer composition particles inferior in the mechanical strength during low temperature processing are obtained.

Here, the terminology that the vinyl acetate residue unit content is continuously distributed in a range of 0 to 30% by weight and one local maximum of the distribution is present indicates composition distribution of the vinyl acetate residue unit content in the vinyl chloride-vinyl acetate copolymers and further uniformity of the composition distribution, and the uniformity increases as the distribution range of the vinyl acetate residue unit content narrows, the local maximum becomes less or the strength thereof increases.

Because of a small change with time in viscosity when used as a paste PVC sol and being excellent, the vinyl chloride-vinyl acetate copolymer particles of the invention are preferably composition particles containing from 0.5 to 2 parts by weight of an alkyl sulfate ester salt with respect to 100 parts by weight of the vinyl chloride-vinyl acetate copolymers. Because of being extremely excellent in both the mechanical strength particularly during low temperature processing and the change with time in viscosity when used as a paste PVC sol and excellent particularly in use for an automobile underbody coating agent or an automotive sealant, the content of the alkyl sulfate ester salt is preferably from 0.8 to 1.5 parts by weight, more preferably 0.9 to 1.2 parts by weight, with respect to 100 parts by weight of the vinyl chloride-vinyl acetate copolymers. Because of a small change with time in the sol viscosity, the alkyl sulfate ester salt is preferably an alkyl sulfate ester salt having the total carbon number of 10 to 14, and includes, for example, a lauryl sulfate, for example, lithium lauryl sulfate, potassium lauryl sulfate, sodium lauryl sulfate, ammonium lauryl sulfate or triethanolammonium lauryl sulfate; an oleyl sulfate, for example, lithium oleyl sulfate, potassium oleyl sulfate, sodium oleyl sulfate, ammonium oleyl sulfate or triethanolammonium oleyl sulfate; and a myristyl sulfate, for example, lithium myristyl sulfate, potassium myristyl sulfate, sodium myristyl sulfate ester salt, ammonium myristyl sulfate or triethanolammonium myristyl sulfate. Particularly, a lauryl sulfate, for example, lithium lauryl sulfate, potassium lauryl sulfate, sodium lauryl sulfate, ammonium lauryl sulfate or triethanolammonium lauryl sulfate is preferred.

The vinyl chloride-vinyl acetate copolymer particles of the invention are an aggregate of primary particles of vinyl chloride-vinyl acetate copolymers having an average diameter of a primary particle of 1 to 2 μm. Because of being extremely excellent in both the mechanical strength particularly during low temperature processing and the change with time in viscosity when used as the paste PVC sol and excellent particularly in use for an automobile underbody coating agent or an automotive sealant, the average diameter of a primary particle is preferably from 1 to 1.7 μm, and more preferably from 1.2 to 1.6 μm. When the average diameter of a primary particle of the vinyl chloride-vinyl acetate copolymers is less than 1 μm, it is not favorable because the change with time in the sol viscosity becomes large. Further, when it is larger than 2 μm, it is not favorable because the mechanical strength during low temperature processing is inferior. The average diameter of a primary particle can be measured as an average primary particle diameter of primary particles in a vinyl chloride-vinyl acetate copolymer latex prior to the formation of the aggregate of the primary particles, which is the vinyl chloride-vinyl acetate copolymer particle.

Because of being extremely excellent in the change with time in viscosity particularly when used as the paste PVC sol and excellent particularly in strength properties, the vinyl chloride-vinyl acetate copolymer particles of the invention preferably has a thickening rate of 90% or less, and further because of excellent in use for an automobile underbody coating agent or an automotive sealant, the thickening rate is preferably less than 50%. A method of measuring the thickening rate will be described later.

Further, because of being excellent in the mechanical strength particularly during low temperature processing and excellent particularly in use for an automobile underbody coating agent or an automotive sealant, the vinyl chloride-vinyl acetate copolymer particles of the invention preferably has tensile strength of 4.0 MPa or more. As to a method for measuring the tensile strength, for example, 100 parts by weight of diisononyl phthalate, 70 parts by weight of calcium carbonate and 15 parts by weight of a naphthenic hydrocarbon solvent are charged to 100 parts by weight of the vinyl chloride-vinyl acetate copolymer particle to prepare a paste PVC sol, the sol is coated in a thickness of 2 mm to form a sheet, and using a JIS 3 dumbbell test piece prepared from the sheet the measurement is performed under conditions of 23° C. and 50 mm/min to determine the tensile strength.

As a production method for producing the vinyl chloride-vinyl acetate copolymer particles of the invention as the composition particles, any method may be used as long as the vinyl chloride-vinyl acetate copolymer composition particles can be produced, and, for example, a method of using the alkyl sulfate ester salt in the production of vinyl chloride-vinyl acetate copolymer particles and a method of adding the alkyl sulfate ester salt to vinyl chloride-vinyl acetate copolymer particles after production are exemplified.

In the production of vinyl chloride-vinyl acetate copolymer particles, a polymerization initiator, a chain transfer agent, a crosslinking agent, a buffering agent, a water-soluble initiator, a reducing agent, a higher alcohol and the like can be appropriately used. The additives described above may be incorporated into the vinyl chloride-vinyl acetate copolymer particles of the invention as long as the object of the invention is achieved. Further, as the method for producing the vinyl chloride-vinyl acetate copolymer particles, for example, a production method of polymerizing a mixed solution of a vinyl chloride monomer and a vinyl acetate monomer in an aqueous medium in the presence of a polymerization initiator is exemplified.

Since it is possible to efficiently produce the vinyl chloride-vinyl acetate copolymers having an average vinyl acetate residue unit content of 5 to 15% by weight, in the production method, a monomer mixture composed of vinyl chloride monomer/vinyl acetate monomer=94/6 to 85/15 (weight/weight) is preferably used, and since it is possible to efficiently produce the vinyl chloride-vinyl acetate copolymer extremely excellent in both the mechanical strength particularly during low temperature processing and the change with time in viscosity when used as a paste PVC sol and excellent particularly in use for an automobile underbody coating agent or an automotive sealant, a monomer mixture composed of vinyl chloride monomer/vinyl acetate monomer =92/8 to 85/15 (weight/weight) is preferably used.

The polymerization initiator may be any one as long as it belongs to the category of the polymerization initiator, and includes, for example, a water-soluble polymerization initiator, for example, potassium persulfate or ammonium persulfate; and an oil-soluble polymerization initiator, for example, an azo compound, for example, azobisisobutyronitrile, a peroxide, for example, lauroyl peroxide, tert-butyl peroxypivalate, a diacyl peroxide, a peroxy ester or a peroxy dicarbonate. Further, in the case of a seed microsuspension polymerization method, a seed particle (seed) containing an oil-soluble initiator may be used.

In the case where the vinyl chloride-vinyl acetate copolymer particles of the invention are the composition particles containing an alkyl sulfate ester salt, a method for incorporating the alkyl sulfate ester salt into the vinyl chloride-vinyl acetate copolymers is not particularly limited, and, for example, a method of adding and kneading the alkyl sulfate ester salt after the completion of the polymerization reaction and a method of adding the alkyl sulfate ester salt before the initiation of the polymerization reaction or during the polymerization reaction are exemplified. As a method for adding the alkyl sulfate ester salt, since it is possible to efficiently produce the vinyl chloride-vinyl acetate copolymer composition particles having the mechanical strength and a small change with time in viscosity when used as a paste PVC sol, it is preferred to continuously or collectively charge before the initiation of polymerization or during the polymerization reaction after the initiation of polymerization. Since it is possible to efficiently produce the vinyl chloride-vinyl acetate copolymer composition particles extremely excellent in both the mechanical strength particularly during low temperature processing and the change with time in viscosity when used as a paste PVC sol and excellent particularly in use for an automobile underbody coating agent or an automotive sealant, it is preferred to continuously or collectively charge from the initiation of polymerization till the polymerization conversion rate reaches to 85%.

As the polymerization method in the production method, a microsuspension polymerization method in which a vinyl chloride monomer, a vinyl acetate monomer, a surfactant, an oil-soluble polymerization initiator and if desired, an emulsifying auxiliary agent, for example, a higher aliphatic alcohol are added to deionized water, and after mixing and dispersing by a homogenizer or the like, polymerization is performed under mild stirring; a seed microsuspension polymerization method which is performed by using a seed particle (seed) containing an oil-soluble polymerization initiator obtained by a microsuspension polymerization method; and a seed emulsion polymerization method in which emulsion polymerization is performed by using, as a seed, a particle obtained by an emulsion polymerization method wherein a vinyl chloride monomer is polymerized together with deionized water, a surfactant and a water-soluble polymerization initiator under mild stirring are exemplified. For example, the polymerization temperature is set to 30 to 80° C. to obtain a vinyl chloride-vinyl acetate copolymer latex or a composition latex. The vinyl chloride-vinyl acetate copolymer latex or composition latex thus-produced by polymerization is spray-dried, and if desired, pulverized to obtain the vinyl chloride-vinyl acetate copolymer particles or composition particles of the invention, in which primary particles of the vinyl chloride-vinyl acetate copolymers are aggregated.

A dryer to be used for forming the vinyl chloride-vinyl acetate copolymer particles or composition particles may be one commonly used, and includes, for example, a spray drier (specific examples thereof include various spray driers described in FIG. 4.10 on page 121 of "Spray Drying Handbook" (by K. Masters, Third Edition, 1979, published by George Godwin Limited)). Drying air inlet temperature and drying air outlet temperature are not particularly limited, and the drying air inlet temperature of 80 to 200° C. and the drying air outlet temperature of 45 to 75° C. are commonly used. The drying air inlet temperature is preferably from 100 to 170° C., and the drying air outlet temperature is preferably from 50 to 70° C. The vinyl chloride-vinyl acetate copolymer particles or composition particles obtained after the drying are an aggregate of primary particles constituting the latex, and has usually a granular form of 10 to 100 μm. In the case where the drying air outlet temperature exceeds 55° C., it is preferred to pulverize the granular vinyl chloride-vinyl acetate copolymer or composition obtained in view of dispersion in a plasticizer, and in the case where the drying air outlet temperature is 55° C. or less, it may be used either the granular form per se or after pulverization.

Effects of the Invention

The vinyl chloride-vinyl acetate copolymer particles of the invention have a small change with time in viscosity of a paste PVC sol prepared by dispersing it in a plasticizer, are excellent in the mechanical strength during low temperature processing, and have excellent properties for a coating agent, particularly for an automobile underbody coating agent or an automotive sealant.

EXAMPLE

The invention will be described more specifically with reference to the examples, but the invention should not be construed as being limited thereto.

The evaluation methods of the vinyl chloride-vinyl acetate copolymer particles obtained in the examples are shown below.

<Method of Measuring Thickening Rate>

100 Parts by weight of vinyl chloride-vinyl acetate copolymer particles, 100 parts by weight of diisononyl phthalate (manufactured by J-Plus Co., Ltd.), 70 parts by weight of fatty acid salt surface treated calcium carbonate (Viscolite-OS (trade name) manufactured by Shiraishi Kogyo Kaisha, Ltd.) and 15 parts by weight of a naphthenic hydrocarbon solvent (Exxsol D40 (trade name) manufactured by Tonen General Sekiyu K.K.) were kneaded to obtain a paste PVC sol. The paste PVC sol obtained was stored at 23° C. for 24 hours, and then its viscosity was measured by a B8H type rotational viscometer under conditions of 23° C. and 20 rpm to obtain Viscosity A. Further, the paste PVC sol obtained was stored at 40° C. for 7 days, allowed to stand at 23° C. for 3 hours, and then its viscosity was measured by a B8H type rotational viscometer under conditions of 23° C. and 20 rpm to obtain Viscosity B. Using Viscosity A and Viscosity B, the thickening rate of the paste PVC sol obtained was determined by the equation shown below.

Thickening rate $(\%) = 100 \times (B-A)/A$

<Method of Measuring Tensile Strength>

100 Parts by weight of vinyl chloride-vinyl acetate copolymer particles, 100 parts by weight of diisononyl phthalate (manufactured by J-Plus Co., Ltd.), 70 parts by weight of fatty acid salt surface treated calcium carbonate (Viscolite-OS (trade name) manufactured by Shiraishi Kogyo Kaisha, Ltd.) and 15 parts by weight of a naphthenic hydrocarbon solvent (Exxsol D40 (trade name) manufactured by Tonen General Sekiyu K.K.) were kneaded to produce a paste PVC sol. The paste PVC sol defoamed was coated on release paper in a thickness of 2 mm, and heated at 140° C. for 30 minutes to form a paste PVC sheet. From the paste PVC sheet obtained a test piece was prepared using a JIS 3 dumbbell, and the tensile strength of the test piece was measured under conditions of 23° C. and 50 mm/min.

<Measurement of Average Polymerization Degree>

The average polymerization degree was determined in accordance with JIS K6721.

<Method of Measuring Average Vinyl Acetate Residue Unit Content>

The average vinyl acetate residue unit content (% by weight) (also referred to as VAc content sometimes) contained in the vinyl chloride-vinyl acetate copolymers was calculated from the equation shown below using a measurement sample prepared by mixing 100 mg of the vinyl chloride-vinyl acetate copolymer particles and 10 mg of potassium bromide, grinding and molding, and an infrared spectrophotometer (FTIR-8100A (trade name) manufactured by Shimadzu Corp.)

VAc content $= (3.73 \times B/A + 0.024) \times 1.04$

A: Abs. value of an absorption peak top due to C—H in-plane bending in vicinity of 1430 $cm^{-1}$.

B: Abs. value of an absorption peak top due to C=O stretching in vicinity of 1740 cm$^{-1}$.

Measurement of Distribution of Vinyl Acetate Residue Unit Content>

The measurement of distribution of vinyl acetate residue unit content was performed by a gradient elution method of high-performance liquid chromatography (HPLC).

Equipment: HPLC 8020 Series (manufactured by Tosoh Corp.)
Detector: Evaporative light-scattering detector (ELSD) Varian 380-LC (manufactured by Varian)
Column: TSKgel ODS-100V (manufactured by Tosoh Corp.)
Column temperature: 40° C.
Mobile phase: A solution: water/acetonitrile=5/5
B solution: Tetrahydrofuran
Flow rate: 1.0 ml/min
Concentration: 1 mg/ml
Injection volume: 20 μm Synthesis Example 1 (production example of seed containing initiator and the like)

Into a 1 m$^3$ autoclave were charged 360 kg of deionized water, 300 kg of vinyl chloride monomer, 6 kg of lauroyl peroxide and 30 kg of a 15% by weight aqueous solution of sodium dodecylbenzenesulfonate, and the polymerization liquid was circulated using a homogenizer for 2 hours to perform homogenization treatment, and then the temperature was raised to 45° C. to proceed the polymerization. After the pressure decreased 0.2 MPa than the saturation vapor pressure of the vinyl chloride monomer at 45° C., the vinyl chloride monomer unreacted was recovered. The resulting seed latex containing initiator and the like (hereinafter abbreviated as Seed 1) had an average particle diameter of 0.60 μm and a solid content concentration of 32%.

Example 1

Into a 2.5 liter autoclave were charged 500 g of deionized water, 715 g of vinyl chloride monomer, 48 g of vinyl acetate monomer, 8.6 g of a 5% aqueous solution of sodium lauryl sulfate, 80 g of Seed 1 and 4 g of a 0.1% aqueous solution of copper sulfate, then the temperature of the reaction mixture was raised to 35° C. to proceed polymerization. Between the initiation of the polymerization and the end of the polymerization, 120 g of a 5% aqueous solution of sodium lauryl sulfate and a 0.05% aqueous solution of ascorbic acid were continuously added. After the pressure of autoclave decreased to 0.22 MPa, the polymerization was terminated.

Then, the unreacted monomer was recovered to obtain a latex, and the latex was subjected to spray drying by a spray drier at a hot air inlet temperature of 160° C. and an outlet temperature of 55° C. thereby obtaining vinyl chloride-vinyl acetate copolymer composition particles. The resulting vinyl chloride-vinyl acetate copolymer composition particles had an average primary particle diameter of 1.5 μm and an average polymerization degree of 2,200, and contained 0.9 parts by weight of sodium lauryl sulfate with respect to 100 parts by weight of the vinyl chloride-vinyl acetate copolymers having an average vinyl acetate residue unit content of 6.6% by weight. The vinyl chloride-vinyl acetate copolymers had the vinyl acetate residue unit content continuously distributed in the range of 0 to 22% by weight and one local maximum of the distribution. Further, using the vinyl chloride-vinyl acetate copolymer composition particles obtained, a paste PVC sol was prepared and physical properties thereof were evaluated. The results are shown in Table 1.

Example 2

Vinyl chloride-vinyl acetate copolymer composition particles were obtained in the same manner as in Example 1, except that the polymerization temperature was changed to 30° C. and the polymerization was terminated after the pressure of autoclave decreased to 0.20 MPa. The resulting vinyl chloride-vinyl acetate copolymer composition particles had an average primary particle diameter of 1.5 μm and an average polymerization degree of 2,900, and contained 0.9 parts by weight of sodium lauryl sulfate with respect to 100 parts by weight of the vinyl chloride-vinyl acetate copolymers having an average vinyl acetate residue unit content of 6.6% by weight. The vinyl chloride-vinyl acetate copolymers had the vinyl acetate residue unit content continuously distributed in the range of 0 to 23% by weight and one local maximum of the distribution. Further, using the vinyl chloride-vinyl acetate copolymer composition particles obtained, a paste PVC sol was prepared and physical properties thereof were evaluated. The results are shown in Table 1.

Example 3

Vinyl chloride-vinyl acetate copolymer composition particles were obtained in the same manner as in Example 1, except that the polymerization temperature was changed to 40° C. and the polymerization was terminated after the pressure of autoclave decreased to 0.28 MPa. The resulting vinyl chloride-vinyl acetate copolymer composition particles had an average primary particle diameter of 1.5 μm and an average polymerization degree of 1,800, and contained 0.9 parts by weight of sodium lauryl sulfate with respect to 100 parts by weight of the vinyl chloride-vinyl acetate copolymers having an average vinyl acetate residue unit content of 6.7% by weight. The vinyl chloride-vinyl acetate copolymers had the vinyl acetate residue unit content continuously distributed in the range of 0 to 24% by weight and one local maximum of the distribution. Further, using the vinyl chloride-vinyl acetate copolymer composition particles obtained, a paste PVC sol was prepared and physical properties thereof were evaluated. The results are shown in Table 1.

Example 4

Vinyl chloride-vinyl acetate copolymer composition particles were obtained in the same manner as in Example 1, except that the amount of the 5% aqueous solution of sodium lauryl sulfate added between the initiation of the polymerization and the end of the polymerization was changed to 200 g. The resulting vinyl chloride-vinyl acetate copolymer composition particles had an average primary particle diameter of 1.5 μm and an average polymerization degree of 2,200, and contained 1.5 parts by weight of sodium lauryl sulfate with respect to 100 parts by weight of the vinyl chloride-vinyl acetate copolymers having an average vinyl acetate residue unit content of 6.8% by weight. The vinyl chloride-vinyl acetate copolymers had the vinyl acetate residue unit content continuously distributed in the range of 0 to 25% by weight and one local maximum of the distribution. Further, using the vinyl chloride-vinyl acetate copolymer composition particles obtained, a paste PVC sol was prepared and physical properties thereof were evaluated. The results are shown in Table 1.

Example 5

Vinyl chloride-vinyl acetate copolymer composition particles were obtained in the same manner as in Example 1, except that the charge amount of Seed 1 was changed to 130 g. The resulting vinyl chloride-vinyl acetate copolymer composition particles had an average primary particle diameter of 1.2 µm and an average polymerization degree of 2,200, and contained 0.9 parts by weight of sodium lauryl sulfate with respect to 100 parts by weight of the vinyl chloride-vinyl acetate copolymers having an average vinyl acetate residue unit content of 6.4% by weight. The vinyl chloride-vinyl acetate copolymers had the vinyl acetate residue unit content continuously distributed in the range of 0 to 24% by weight and one local maximum of the distribution. Further, using the vinyl chloride-vinyl acetate copolymer composition particles obtained, a paste PVC sol was prepared and physical properties thereof were evaluated. The results are shown in Table 1.

Example 6

Into a 1 m$^3$ autoclave were charged 350 kg of deionized water, 219 kg (55% by weight with respect to the total charge amount of monomer mixture) of vinyl chloride monomer and 34 kg (9% by weight with respect to the total charge amount of monomer mixture) of vinyl acetate monomer as first stage charge monomer, 0.9 kg of a 25% aqueous solution of sodium lauryl sulfate, 42 kg of Seed 1 and 20 g of a 10% aqueous solution of copper sulfate, then the temperature of the reaction mixture was raised to 40° C. to initiate first stage polymerization, and a 0.2% by weight aqueous solution of ascorbic acid was continuously added so as to maintain the polymerization temperature throughout the whole polymerization time. When the polymerization conversion rate reached to 85%, 146 kg (37% by weight with respect to the total charge amount of monomer mixture) of vinyl chloride monomer was charged as second stage charge monomer into the 1 m$^3$ autoclave, and second stage polymerization was continued at the polymerization temperature of 35° C. When the polymerization conversion rate with respect to the sum of the first stage charge monomer and the second stage charge monomer reached to 90%, the polymerization was terminated.

Between the initiation of the polymerization and the end of the polymerization, 10 kg of a 25% aqueous solution of sodium lauryl sulfate and 3 kg of a 15% aqueous solution of nonylpropenylphenol-ethylene oxide (10 moles) adduct sulfate ammonium salt (Aqualon HS-10 (trade name) manufactured by Dai-ichi Kogyo Seiyaku Co., Ltd.) were continuously added.

Then, the unreacted monomer was recovered to obtain a latex, and polyvinyl alcohol having polymerization degree of 600 and saponification degree of 93% by mole (Gohsenol AL-06R (trade name) manufactured by Nippon Synthetic Chemical Industry Co., Ltd.) was added to the latex so that the content with respect to the vinyl chloride-vinyl acetate copolymer became 5,000 ppm.

The latex was subjected to spray drying by a spray drier at a hot air inlet temperature of 160° C. and an outlet temperature of 55° C. thereby obtaining vinyl chloride-vinyl acetate copolymer composition particles. The resulting vinyl chloride-vinyl acetate copolymer composition particles had an average primary particle diameter of 1.5 µm and an average polymerization degree of 2,100, and contained 0.8 parts by weight of sodium lauryl sulfate with respect to 100 parts by weight of the vinyl chloride-vinyl acetate copolymers having an average vinyl acetate residue unit content of 6.0% by weight. The vinyl chloride-vinyl acetate copolymers had the vinyl acetate residue unit content continuously distributed in the range of 0 to 22% by weight and one local maximum of the distribution. Further, using the vinyl chloride-vinyl acetate copolymer composition particles obtained, a paste PVC sol was prepared and physical properties thereof were evaluated. The results are shown in Table 1.

Example 7

Into a 1 m$^3$ autoclave were charged 350 kg of deionized water, 255 kg (64% by weight with respect to the total charge amount of monomer mixture) of vinyl chloride monomer and 35 kg (9% by weight with respect to the total charge amount of monomer mixture) of vinyl acetate monomer as first stage charge monomer, 0.9 kg of a 25% aqueous solution of sodium lauryl sulfate, 42 kg of Seed 1 and 20 g of a 10% aqueous solution of copper sulfate, then the temperature of the reaction mixture was raised to 35° C. to initiate first stage polymerization, and a 0.2% by weight aqueous solution of ascorbic acid was continuously added so as to maintain the polymerization temperature throughout the whole polymerization time. When the polymerization conversion rate reached to 50%, 73 kg (18% by weight with respect to the total charge amount of monomer mixture) of vinyl chloride monomer was charged as second stage charge monomer into the 1 m$^3$ autoclave, and second stage polymerization was continued at the polymerization temperature of 35° C.

Further, when the polymerization conversion rate with respect to the sum of the first stage charge monomer and the second stage charge monomer reached to 75%, 36 kg (9% by weight with respect to the total charge amount of monomer mixture) of vinyl chloride monomer was charged as third stage charge monomer into the 1 m$^3$ autoclave, and third stage polymerization was continued at the polymerization temperature of 35° C., and when the polymerization conversion rate with respect to the sum of the monomer mixture reached to 90%, the polymerization was terminated.

Between the initiation of the polymerization and the end of the polymerization, 10 kg of a 25% aqueous solution of sodium lauryl sulfate and 3 kg of a 15% aqueous solution of nonylpropenylphenol-ethylene oxide (10 moles) adduct sulfate ammonium salt (Aqualon HS-10 (trade name) manufactured by Dai-ichi Kogyo Seiyaku Co., Ltd.) were continuously added.

Then, the unreacted monomer was recovered to obtain a latex, and the latex was subjected to spray drying by a spray drier at a hot air inlet temperature of 160° C. and an outlet temperature of 55° C. thereby obtaining vinyl chloride-vinyl acetate copolymer composition particles. The resulting vinyl chloride-vinyl acetate copolymer composition particles had an average primary particle diameter of 1.5 µm and an average polymerization degree of 2,300, and contained 0.8 parts by weight of sodium lauryl sulfate with respect to 100 parts by weight of the vinyl chloride-vinyl acetate copolymers having an average vinyl acetate residue unit content of 6.0% by weight. The vinyl chloride-vinyl acetate copolymers had the vinyl acetate residue unit content continuously distributed in the range of 0 to 18% by weight and one local maximum of the distribution. Further, using the vinyl chloride-vinyl acetate copolymer composition particles obtained, a paste PVC sol was prepared and physical properties thereof were evaluated. The results are shown in Table 1.

Example 8

Into a 2.5 liter autoclave were charged 500 g of deionized water, 493 g (62% by weight with respect to the total charge amount of monomer mixture) of vinyl chloride monomer and 96 g (12% by weight with respect to the total charge amount of monomer mixture) of vinyl acetate monomer as first stage charge monomer, 9 g of a 5% aqueous solution of sodium lauryl sulfate, 85 g of Seed 1 and 4 g of a 0.1% aqueous solution of copper sulfate, then the temperature of the reaction mixture was raised to 35° C. to initiate first stage polymerization, and a 0.05% by weight aqueous solution of ascorbic acid was continuously added so as to maintain the polymerization temperature throughout the whole polymerization time. When the polymerization conversion rate reached to 50%, 141 g (17% by weight with respect to the total charge amount of monomer mixture) of vinyl chloride monomer was charged as second stage charge monomer into the 2.5 liter autoclave, and second stage polymerization was continued at the polymerization temperature of 35° C. Further, when the polymerization conversion rate with respect to the sum of the first stage charge monomer and the second stage charge monomer reached to 75%, 70 g (9% by weight with respect to the total charge amount of monomer mixture) of vinyl chloride monomer was charged as third stage charge monomer into the 2.5 liter autoclave, and third stage polymerization was continued at the polymerization temperature of 35° C., and when the polymerization conversion rate with respect to the sum of the monomer mixture reached to 90%, the polymerization was terminated.

Between the initiation of the polymerization and the end of the polymerization, 120 g of a 5% aqueous solution of sodium lauryl sulfate was continuously added.

Then, the unreacted monomer was recovered to obtain a latex, and the latex was subjected to spray drying by a spray drier at a hot air inlet temperature of 160° C. and an outlet temperature of 55° C. thereby obtaining vinyl chloride-vinyl acetate copolymer composition particles. The resulting vinyl chloride-vinyl acetate copolymer composition particles had an average primary particle diameter of 1.6 μm and an average polymerization degree of 2,400, and contained 0.9 parts by weight of sodium lauryl sulfate with respect to 100 parts by weight of the vinyl chloride-vinyl acetate copolymers having an average vinyl acetate residue unit content of 8.8% by weight. The vinyl chloride-vinyl acetate copolymers had the vinyl acetate residue unit content continuously distributed in the range of 0 to 21% by weight and one local maximum of the distribution. Further, using the vinyl chloride-vinyl acetate copolymer composition particles obtained, a paste PVC sol was prepared and physical properties thereof were evaluated. The results are shown in Table 1.

Example 9

Into a 2.5 liter autoclave were charged 500 g of deionized water, 511 g (64% by weight with respect to the total charge amount of monomer mixture) of vinyl chloride monomer and 72 g (9% by weight with respect to the total charge amount of monomer mixture) of vinyl acetate monomer as first stage charge monomer, 9 g of a 5% aqueous solution of sodium lauryl sulfate, 85 g of Seed 1 and 4 g of a 0.1% aqueous solution of copper sulfate, then the temperature of the reaction mixture was raised to 35° C. to initiate first stage polymerization, and a 0.05% by weight aqueous solution of ascorbic acid was continuously added so as to maintain the polymerization temperature throughout the whole polymerization time. When the polymerization conversion rate reached to 40%, 73 g (9% by weight with respect to the total charge amount of monomer mixture) of vinyl chloride monomer was charged as second stage charge monomer into the 2.5 liter autoclave, and second stage polymerization was continued at the polymerization temperature of 35° C. Further, when the polymerization conversion rate with respect to the sum of the first stage charge monomer and the second stage charge monomer reached to 60%, 73 g (9% by weight with respect to the total charge amount of monomer mixture) of vinyl chloride monomer was charged as third stage charge monomer into the 2.5 liter autoclave, and third stage polymerization was continued at the polymerization temperature of 35° C.

Moreover, when the polymerization conversion rate with respect to the sum of the first stage charge monomer, the second stage charge monomer and the third stage charge monomer reached to 75%, 36 g (5% by weight with respect to the total charge amount of monomer mixture) of vinyl chloride monomer was charged as fourth stage charge monomer into the 2.5 liter autoclave, and fourth stage polymerization was continued at the polymerization temperature of 35° C. Furthermore, when the polymerization conversion rate with respect to the sum of the first stage charge monomer, the second stage charge monomer, the third stage charge monomer and the fourth stage charge monomer reached to 85%, 36 g (5% by weight with respect to the total charge amount of monomer mixture) of vinyl chloride monomer was charged as fifth stage charge monomer into the 2.5 liter autoclave, and fifth stage polymerization was continued at the polymerization temperature of 35° C.

When the polymerization conversion rate with respect to the sum of the monomer mixture reached to 90%, the polymerization was terminated.

Between the initiation of the polymerization and the end of the polymerization, 120 g of a 5% aqueous solution of sodium lauryl sulfate was continuously added.

Then, the unreacted monomer was recovered to obtain a latex, and the latex was subjected to spray drying by a spray drier at a hot air inlet temperature of 160° C. and an outlet temperature of 55° C. thereby obtaining vinyl chloride-vinyl acetate copolymer composition particles. The resulting vinyl chloride-vinyl acetate copolymer composition particles had an average primary particle diameter of 1.5 μm and an average polymerization degree of 2,100, and contained 0.9 parts by weight of sodium lauryl sulfate with respect to 100 parts by weight of the vinyl chloride-vinyl acetate copolymers having an average vinyl acetate residue unit content of 6.6% by weight. The vinyl chloride-vinyl acetate copolymers had the vinyl acetate residue unit content continuously distributed in the range of 0 to 19% by weight and one local maximum of the distribution. Further, using the vinyl chloride-vinyl acetate copolymer composition particles obtained, a paste PVC sol was prepared and physical properties thereof were evaluated. The results are shown in Table 1.

Example 10

Into a 1 m³ autoclave were charged 350 kg of deionized water, 224 kg (56% by weight with respect to the total charge amount of monomer mixture) of vinyl chloride monomer and 26 kg (7% by weight with respect to the total charge amount of monomer mixture) of vinyl acetate monomer as first stage charge monomer, 1 kg of a 20% aqueous solution of sodium dodecylbenzenesulfonate, 42 kg of Seed 1 and 20 g of a 10% aqueous solution of copper sulfate, then the temperature of the reaction mixture was raised to 45° C. to initiate first stage polymerization, and a 0.2% by weight aqueous solution of ascorbic acid was continuously added so as to maintain the polymerization temperature throughout the whole polymerization time. When the polymerization conversion rate reached to 85%, 149 kg (37% by weight with respect to the total charge amount of monomer mixture) of vinyl chloride monomer was charged as second stage charge monomer into the 1 m³ autoclave, and second stage polymerization was continued at the polymerization temperature of 40° C. When the polymerization conversion rate with respect to the sum of the first stage charge monomer and the second stage charge monomer reached to 90%, the polymerization was terminated. Between the initiation of the polymerization and the end of the polymerization, 15 kg of a 20% aqueous solution of sodium dodecylbenzenesulfonate was continuously added.

Then, the unreacted monomer was recovered to obtain a latex, and the latex was subjected to spray drying by a spray drier at a hot air inlet temperature of 160° C. and an outlet temperature of 55° C. thereby obtaining vinyl chloride-vinyl acetate copolymer composition particles. The resulting vinyl chloride-vinyl acetate copolymer composition particles had an average primary particle diameter of 1.2 μm and contained a vinyl chloride-vinyl acetate copolymers having an average polymerization degree of 1,720 and an average vinyl acetate residue unit content of 5.0% by weight. The vinyl chloride-vinyl acetate copolymers had the vinyl acetate residue unit content continuously distributed in the range of 0 to 21% by weight and one local maximum of the distribution. Further, using the vinyl chloride-vinyl acetate copolymer composition particles obtained, a paste PVC sol was prepared and physical properties thereof were evaluated. The results are shown in Table 1.

Example 11

Into a 2.5 liter autoclave were charged 500 g of deionized water, 493 g (62% by weight with respect to the total charge amount of monomer mixture) of vinyl chloride monomer and 96 g (12% by weight with respect to the total charge amount of monomer mixture) of vinyl acetate monomer as first stage charge monomer, 9 g of a 5% aqueous solution of sodium lauryl sulfate, 85 g of Seed 1 and 4 g of a 0.1% aqueous solution of copper sulfate, then the temperature of the reaction mixture was raised to 35° C. to initiate first stage polymerization, and a 0.05% by weight aqueous solution of ascorbic acid was continuously added so as to maintain the polymerization temperature throughout the whole polymerization time. When the polymerization conversion rate reached to 50%, 141 g (17% by weight with respect to the total charge amount of monomer mixture) of vinyl chloride monomer was charged as second stage charge monomer into the 2.5 liter autoclave, and second stage polymerization was continued at the polymerization temperature of 35° C.

Further, when the polymerization conversion rate with respect to the sum of the first stage charge monomer and the second stage charge monomer reached to 80%, 70 kg (9% by weight with respect to the total charge amount of monomer mixture) of vinyl chloride monomer was charged as third stage charge monomer into the 2.5 liter autoclave, and third stage polymerization was continued at the polymerization temperature of 35° C., and when the polymerization conversion rate with respect to the sum of the monomer mixture reached to 90%, the polymerization was terminated.

Between the initiation of the polymerization and the end of the polymerization, 100 g of a 5% aqueous solution of sodium lauryl sulfate and 20 g of a 5% aqueous solution of nonylpropenylphenol-ethylene oxide (10 moles) adduct sulfate ammonium salt (Aqualon HS-10 (trade name) manufactured by Dai-ichi Kogyo Seiyaku Co., Ltd.) were continuously added.

Then, the unreacted monomer was recovered to obtain a latex, and the latex was subjected to spray drying by a spray drier at a hot air inlet temperature of 160° C. and an outlet temperature of 55° C. thereby obtaining vinyl chloride-vinyl acetate copolymer composition particles. The resulting vinyl chloride-vinyl acetate copolymer composition particles had an average primary particle diameter of 1.5 μm and an average polymerization degree of 1,840, and contained 0.8 parts by weight of sodium lauryl sulfate with respect to 100 parts by weight of the vinyl chloride-vinyl acetate copolymers having an average vinyl acetate residue unit content of 8.7% by weight. The vinyl chloride-vinyl acetate copolymers had the vinyl acetate residue unit content continuously distributed in the range of 0 to 20% by weight and one local maximum of the distribution. Further, using the vinyl chloride-vinyl acetate copolymer composition particles obtained, a paste PVC sol was prepared and physical properties thereof were evaluated. The results are shown in Table 1.

TABLE 1

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Vinyl Acetate Residue Unit Content Distribution | Upper Limit (% by weight) | 0 | 0 | 0 | 0 | 0 | 0 | 0 | 0 | 0 | 0 | 0 |
| | Lower Limit (% by weight) | 22 | 23 | 24 | 25 | 24 | 22 | 18 | 21 | 19 | 21 | 20 |
| | Continuity | Continuous | Continuous | Continuous | Continuous | Continuous | Continuous | Continuous | Continuous | Continuous | Continuous | Continuous |
| | Number of local Maximum | 1 | 1 | 1 | 1 | 1 | 1 | 1 | 1 | 1 | 1 | 1 |
| Average Vinyl Acetate Residue Unit Content (% by weight) | | 6.6 | 6.6 | 6.7 | 6.8 | 6.4 | 6.0 | 6.0 | 8.8 | 6.6 | 5.0 | 8.7 |
| Average Diameter of Primary Particle (μm) | | 1.5 | 1.5 | 1.5 | 1.5 | 1.2 | 1.5 | 1.5 | 1.6 | 1.5 | 1.2 | 1.5 |

TABLE 1-continued

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Average Polymerization Degree | 2,200 | 2,900 | 1,800 | 2,200 | 2,200 | 2,100 | 2,300 | 2,400 | 2,100 | 1,720 | 1,840 |
| Alkyl Sulfate Ester Salt (parts by weight) | 0.9 | 0.9 | 0.9 | 1.5 | 0.9 | 0.9 | 0.9 | 0.9 | 0.9 | 0 | 0.8 |
| Thickening rate (%) | 26 | 13 | 48 | 30 | 42 | 39 | 20 | 30 | 26 | 34 | 73 |
| Tensile Strength (MPa) | 4.3 | 4.1 | 4.2 | 4.1 | 4.6 | 4.3 | 4.7 | 4.7 | 4.4 | 4.1 | 5.2 |

Comparative Example 1

Into a 2.5 liter autoclave were charged 500 g of deionized water, 220 g (27% by weight with respect to the total charge amount of monomer mixture) of vinyl chloride monomer and 71 g (9% by weight with respect to the total charge amount of monomer mixture) of vinyl acetate monomer as first stage charge monomer, 9 g of a 5% aqueous solution of sodium lauryl sulfate, 80 g of Seed 1 and 4 g of a 0.1% aqueous solution of copper sulfate, then the temperature of the reaction mixture was raised to 45° C. to initiate first stage polymerization, and a 0.05% by weight aqueous solution of ascorbic acid was continuously added so as to maintain the polymerization temperature throughout the whole polymerization time. When the polymerization conversion rate reached to 85%, 219 g (27% by weight with respect to the total charge amount of monomer mixture) of vinyl chloride monomer was charged as second stage charge monomer into the 2.5 liter autoclave, and second stage polymerization was continued at the polymerization temperature of 45° C. Further, when the polymerization conversion rate with respect to the sum of the first stage charge monomer and the second stage charge monomer reached to 87%, 292 g (37% by weight with respect to the total charge amount of monomer mixture) of vinyl chloride monomer was charged as third stage charge monomer into the 2.5 liter autoclave, and third stage polymerization was continued at the polymerization temperature of 45° C., and when the polymerization conversion rate with respect to the sum of the monomer mixture reached to 90%, the polymerization was terminated. Between the initiation of the polymerization and the end of the polymerization, 120 g of a 5% aqueous solution of sodium lauryl sulfate was continuously added.

Then, the unreacted monomer was recovered to obtain a latex, and the latex was subjected to spray drying by a spray drier at a hot air inlet temperature of 160° C. and an outlet temperature of 55° C. thereby obtaining vinyl chloride-vinyl acetate copolymer composition particles. The resulting vinyl chloride-vinyl acetate copolymer composition particles had an average primary particle diameter of 1.5 μm and an average polymerization degree of 1,400, and contained 0.9 parts by weight of sodium lauryl sulfate with respect to 100 parts by weight of the vinyl chloride-vinyl acetate copolymers having an average vinyl acetate residue unit content of 7.3% by weight. The vinyl chloride-vinyl acetate copolymers had the vinyl acetate residue unit content continuously distributed in the range of 0 to 29% by weight and two local maximums of the distribution. Further, using the vinyl chloride-vinyl acetate copolymer composition particles obtained, a paste PVC sol was prepared and physical properties thereof were evaluated. The results are shown in Table 2.

Comparative Example 2

Vinyl chloride-vinyl acetate copolymer composition particles were obtained in the same manner as in Comparative Example 1, except that the polymerization temperatures of the first stage, second stage and third stage were changed to 40° C. The resulting vinyl chloride-vinyl acetate copolymer composition particles had an average primary particle diameter of 1.5 jam and an average polymerization degree of 1,800, and contained 0.9 parts by weight of sodium lauryl sulfate with respect to 100 parts by weight of the vinyl chloride-vinyl acetate copolymers having an average vinyl acetate residue unit content of 7.5% by weight. The vinyl chloride-vinyl acetate copolymers had the vinyl acetate residue unit content continuously distributed in the range of 0 to 27% by weight and two local maximums of the distribution. Further, using the vinyl chloride-vinyl acetate copolymer composition particles obtained, a paste PVC sol was prepared and physical properties thereof were evaluated. The results are shown in Table 2.

Comparative Example 3

Vinyl chloride-vinyl acetate copolymer composition particles were obtained in the same manner as in Example 1, except that the polymerization temperatures was changed to 45° C. and the polymerization was terminated after the pressure of autoclave decreased to 0.33 MPa. The resulting vinyl chloride-vinyl acetate copolymer composition particles had an average primary particle diameter of 1.5 μm and an average polymerization degree of 1,400, and contained 0.9 parts by weight of sodium lauryl sulfate with respect to 100 parts by weight of the vinyl chloride-vinyl acetate copolymers having an average vinyl acetate residue unit content of 7.0% by weight. The vinyl chloride-vinyl acetate copolymers had the vinyl acetate residue unit content continuously distributed in the range of 0 to 22% by weight and two local maximums of the distribution. Further, using the vinyl chloride-vinyl acetate copolymer composition particles obtained, a paste PVC sol was prepared and physical properties thereof were evaluated. The results are shown in Table 2.

Comparative Example 4

Vinyl chloride-vinyl acetate copolymer composition particles were obtained in the same manner as in Comparative Example 1, except that the polymerization temperatures of the first stage, second stage and third stage were changed to 54° C. The resulting vinyl chloride-vinyl acetate copolymer composition particles had an average primary particle diameter of 1.5 μm and an average polymerization degree of 1,000, and contained 0.9 parts by weight of sodium lauryl sulfate with respect to 100 parts by weight of the vinyl chloride-vinyl acetate copolymers having an average vinyl acetate residue unit content of 7.2% by weight. The vinyl chloride-vinyl acetate copolymers had the vinyl acetate residue unit content continuously distributed in the range of 0 to 26% by weight and two local maximums of the distribution. Further, using the vinyl chloride-vinyl acetate copolymer composition particles obtained, a paste PVC sol was prepared and physical properties thereof were evaluated. The results are shown in Table 2.

Comparative Example 5

Vinyl chloride-vinyl acetate copolymer composition particles were obtained in the same manner as in Comparative Example 1, except that the amount of the vinyl acetate monomer was changed to 120 g. The resulting vinyl chloride-vinyl acetate copolymer composition particles had an average primary particle diameter of 1.5 μm and an average polymerization degree of 1,800, and contained 0.9 parts by weight of sodium lauryl sulfate with respect to 100 parts by weight of the vinyl chloride-vinyl acetate copolymers having an average vinyl acetate residue unit content of 12.1% by weight. The vinyl chloride-vinyl acetate copolymers had the vinyl acetate residue unit content continuously distributed in the range of 0 to 27% by weight and two local maximums of the distribution. Further, using the vinyl chloride-vinyl acetate copolymer composition particles obtained, a paste PVC sol was prepared and physical properties thereof were evaluated. The results are shown in Table 2.

TABLE 2

|  |  | Comparative Example 1 | Comparative Example 2 | Comparative Example 3 | Comparative Example 4 | Comparative Example 5 |
|---|---|---|---|---|---|---|
| Vinyl Acetate Residue Unit Content Distribution | Upper Limit (% by weight) | 0 | 0 | 0 | 0 | 0 |
|  | Lower Limit (% by weight) | 29 | 27 | 22 | 26 | 27 |
|  | Continuity | Continuous | Continuous | Continuous | Continuous | Continuous |
|  | Frequency of Local Maximum | 2 | 2 | 2 | 2 | 2 |
| Average Vinyl Acetate Residue Unit Content (% by weight) |  | 7.3 | 7.5 | 7.0 | 7.2 | 12.1 |
| Average Diameter of Primary Particle (μm) |  | 1.5 | 1.5 | 1.5 | 1.5 | 1.5 |
| Average Polymerization Degree |  | 1,400 | 1,800 | 1,400 | 1,000 | 1,800 |
| Alkyl Sulfate Ester Salt (parts by weight) |  | 0.9 | 0.9 | 0.9 | 0.9 | 0.9 |
| Thickening rate (%) |  | 190 | 120 | 90 | — | — |
| Tensile Strength (MPa) |  | 3.2 | 3.8 | 3.8 | 3.0 | 4.5 |

INDUSTRIAL APPLICABILITY

The vinyl chloride-vinyl acetate copolymer particles and vinyl chloride-vinyl acetate copolymer composition particles of the invention have a small change with time in viscosity of a paste PVC sol prepared by dispersing those in a plasticizer, are excellent in the mechanical strength during low temperature processing, have excellent properties for a coating agent, particularly for an automobile underbody coating agent or an automotive sealant, and have high industrial utility value.

The invention claimed is:

1. Vinyl chloride-vinyl acetate copolymer particles comprising:
    vinyl chloride-vinyl acetate copolymers in which a vinyl acetate residue unit content is continuously distributed in a range of 0 to 30% by weight and the distribution has one local maximum, and which have an average degree of polymerization of 1,500 to 3,000 and an average vinyl acetate residue unit content of 5 to 15% by weight,
    wherein an average diameter of a primary particle of the vinyl chloride-vinyl acetate copolymers is from 1 to 2 μm.

2. The vinyl chloride-vinyl acetate copolymer particles as claimed in claim 1 comprising:
    a composition containing from 0.5 to 2 parts by weight of an alkyl sulfate ester salt with respect to 100 parts by weight of vinyl chloride-vinyl acetate copolymers in which a vinyl acetate residue unit content is continuously distributed in a range of 0 to 30% by weight and the distribution has one local maximum, and which have an average degree of polymerization of 1,500 to 3,000 and an average vinyl acetate residue unit content of 5 to 15% by weight,
    wherein an average diameter of a primary particle of the vinyl chloride-vinyl acetate copolymers is from 1 to 2 μm.

3. The vinyl chloride-vinyl acetate copolymer particles as claimed in claim 2,
    wherein the alkyl sulfate ester salt is one selected from the group consisting of lithium lauryl sulfate, sodium lauryl sulfate, ammonium lauryl sulfate and triethanol ammonium lauryl sulfate.

4. The vinyl chloride-vinyl acetate copolymer particles as claimed in claim 1,
    wherein the vinyl acetate residue unit content is continuously distributed in a range of 0 to 25% by weight and the distribution has one local maximum in the vinyl chloride-vinyl acetate copolymers.

5. The vinyl chloride-vinyl acetate copolymer particles as claimed in claim 1,
    wherein the vinyl acetate residue unit content is continuously distributed in a range of 0 to 20% by weight and the distribution has one local maximum in the vinyl chloride-vinyl acetate copolymers.

6. An automobile underbody coating agent containing the vinyl chloride-vinyl acetate copolymer particles as claimed in claim 1.

7. A method for producing an automobile underbody coating comprising heat sealing the automobile underbody coating agent as claimed in claim 6.

\* \* \* \* \*